(12) United States Patent
Wang et al.

(10) Patent No.: US 11,489,677 B2
(45) Date of Patent: Nov. 1, 2022

(54) QDS-BASED MAIL SYSTEM AND TRANSCEIVING METHOD

(71) Applicant: Nanjing University of Posts and Telecommunications, Jiangsu (CN)

(72) Inventors: Qin Wang, Jiangsu (CN); Chunhui Zhang, Jiangsu (CN); Jingyang Liu, Jiangsu (CN)

(73) Assignee: Nanjing University of Posts and Telecommunications, Jiangsu (CN)

( * ) Notice: Subject to any disclaimer, the term of this patent is extended or adjusted under 35 U.S.C. 154(b) by 112 days.

(21) Appl. No.: 17/253,125

(22) PCT Filed: Jan. 6, 2020

(86) PCT No.: PCT/CN2020/070400
§ 371 (c)(1),
(2) Date: Dec. 17, 2020

(87) PCT Pub. No.: WO2021/056926
PCT Pub. Date: Apr. 1, 2021

(65) Prior Publication Data
US 2021/0351936 A1  Nov. 11, 2021

(30) Foreign Application Priority Data

Sep. 24, 2019  (CN) .......................... 201910904251.5

(51) Int. Cl.
*H04L 9/32* (2006.01)
*H04L 9/08* (2006.01)
(Continued)

(52) U.S. Cl.
CPC .......... *H04L 9/3247* (2013.01); *H04L 9/0819* (2013.01); *H04L 9/0852* (2013.01);
(Continued)

(58) Field of Classification Search
CPC ..... H04L 9/3247; H04L 51/42; H04L 9/0819; H04L 9/0852; H04L 9/0861; H04L 9/14
See application file for complete search history.

(56) References Cited

U.S. PATENT DOCUMENTS

2002/0199108 A1* 12/2002 Chuang ................. H04L 9/0852
713/176
2013/0083926 A1* 4/2013 Hughes ................. H04L 9/3247
380/278
(Continued)

FOREIGN PATENT DOCUMENTS

| CN | 106452791 | 2/2017 |
| CN | 108923914 | 11/2018 |
| CN | 110493010 | 11/2019 |

OTHER PUBLICATIONS

Petros Wallden, Vedran Dunjko, Adiran Kent, Erika Anderson, "Quantum digital signatures with quantum-key-distribution components", Apr. 2015 (Year: 2015).*

(Continued)

*Primary Examiner* — Darshan I Dhruv
(74) *Attorney, Agent, or Firm* — JCIP Global Inc.

(57) ABSTRACT

A Quantum Digital Signature (QDS)-based mail system and a transceiving method are provided. The system is a three-layer structure formed by a physical layer, a key layer, and an application layer. The physical layer is a key generation terminal and is used to generate a key string for signature in real time; the key layer is used to store the key string generated by the physical layer and provide a required key to the upper layer, namely, the application layer when required; and the application layer is a transceiving software part in the mail system, and is used to extract keys generated by the physical layer from the key layer so as to encrypt information to be sent. The mail transceiving method comprises: a quantum key distribution (QKD) phase, a mail signature phase, and a signature verification phase.

4 Claims, 3 Drawing Sheets

(51) Int. Cl.
H04L 9/14 (2006.01)
H04L 12/58 (2006.01)
H04L 51/42 (2022.01)

(52) U.S. Cl.
CPC .............. *H04L 9/0861* (2013.01); *H04L 9/14* (2013.01); *H04L 51/42* (2022.05)

(56) References Cited

U.S. PATENT DOCUMENTS

| | | | | |
|---|---|---|---|---|
| 2013/0101121 | A1* | 4/2013 | Nordholt | H04L 63/062 380/279 |
| 2016/0359624 | A1* | 12/2016 | Kim | H04B 10/70 |
| 2017/0250796 | A1* | 8/2017 | Samid | H04L 9/0838 |
| 2019/0149327 | A1* | 5/2019 | Yuan | H04L 9/0852 380/255 |

OTHER PUBLICATIONS

"Petros Wallden,*Vedran Dunjko,Adrian Kent,Erika Andersson", Quantum digital signatures with quantum-key-distribution components (Year: 2015).*

"International Search Report (Form PCT/ISA/210) of PCT/CN2020/070400," dated Jun. 23, 2020, pp. 1-4.

Petros Wallden, et al., "Quantum digital signatures with quantum-key-distribution components," Physical Review A 91, Apr. 2015, pp. 1-10.

* cited by examiner

QDS-BASED MAIL SYSTEM AND TRANSCEIVING METHOD

CROSS-REFERENCE TO RELATED APPLICATION

This application is a 371 of international application of PCT application serial no. PCT/CN2020/070400, filed on Jan. 6, 2020, which claims the priority benefit of China application no. 201910904251.5, filed on Sep. 24, 2019. The entirety of each of the above-mentioned patent applications is hereby incorporated by reference herein and made a part of this specification.

BACKGROUND

Technical Field

The present invention relates to the field of financial and network information security, and in particular, to a Quantum Digital Signature (QDS)-based mail system and a transceiving method.

Description of Related Art

In order to guarantee authenticity of transmitted information in digital signature application scenarios at present, a specific signature algorithm (for example, the Hash algorithm) is usually used before information transmission to sign the message. Signature information obtained after calculation is attached to the message and then sent to a server together with the message. Afterwards, a receiving end performs the same calculation upon acquiring the message content, and compares a calculation result with the signature information carried at the rear of the transmitting end. If they are consistent, it indicates that the message content has not been tampered with; otherwise it indicates that the message is likely to be tampered with. The security of the message with a digital signature in such a form depends on the complexity of the algorithm. That is to say, a computer which is powerful enough is likely to eventually decipher the message. Because quantum cryptography offers unconditional security in theory, that is, it is theoretically unbreakable, a QDS-based mail system integrated with quantum cryptography technology is applicable to application scenarios with a high security requirement.

SUMMARY

The security of existing mails mainly depends on the complexity of a signature algorithm. Therefore, in order to solve the problem that the message security depends on the algorithm complexity, the present invention provides a QDS-based mail system and a transceiving method. The security of mails encrypted by means of the QDS no longer depends on the algorithm complexity, but is guaranteed based on the fundamental principle of quantum mechanics. Because the QDS is theoretically unbreakable, the use of the QDS to encrypt the mails strongly guarantees the security of the mails as compared with an algorithm-based signature.

A QDS-based mail system and a transceiving method are provided, where the mail system is a three-layer structure formed by a physical layer, a key layer, and an application layer; the physical layer is a key generation terminal and is used to generate a key string for signature in real time; the key layer is used to store the key string generated by the physical layer and provide a required key to the upper layer, namely, the application layer when required; and the application layer is a transceiving software part in the mail system, and is used to extract keys generated by the physical layer from the key layer so as to encrypt information to be sent. A use terminal corresponding to the application layer includes clients A and B and a server S; the client A serves as a transmitting end and the client B servers as a receiving end.

The mail transceiving method includes: a quantum key distribution (QKD) phase, a mail signature phase, and a signature verification phase. In the QKD phase, the transmitting end A needs to acquire two sets of keys respectively for the server S and the receiving end B, which are used to encrypt bits 1 and 0 respectively, where the keys are generated by the physical layer and stored in the key layer; and when required, the application layer takes the corresponding keys out of the key layer at any time. In the mail signature phase, the client is in charge of signing a message with the possessed keys. And the signature verification phase includes two verification procedures: in the first procedure, the server verifies a message signature, and in the second procedure, the receiving end B verifies the message signature.

Further, the distribution phase includes the following steps:

step 1-1: assuming that the client A needs to send a message to the client B, generating, by the clients A and B, initial keys according to a key generation protocol (KGP), where A possesses two keys $A_1^B$ and $A_0^B$ each having a length of L, $A_1^B$ is used to sign the bit 1 and $A_0^B$ is used to sign the bit 0; and in this case, the client B also possesses two corresponding keys $K_0^B$ and $K_1^B$ each having a length of L, the superscripts indicating that the keys are possessed by the client B and the subscripts indicating a specific message to be verified in the future;

step 1-2: generating, by the client A and the server S, initial keys also according to the KGP, where A possesses two keys $A_1^S$ and $A_0^S$ each having a length of L, $A_1^S$ is used to encrypt the bit 1, and $A_0^S$ is used to encrypt the bit 0; and in this case, the server S also possesses two corresponding keys $K_0^S$ and $K_1^S$ each having a length of L, the superscripts indicating that the keys are possessed by the server S and the subscripts indicating a specific message to be verified in the future; and step 1-3: in the case where the client A possesses four keys $A_0^B, A_1^B, A_0^S$, and $A_1^S$ each having a length of L bits after the foregoing procedure, selecting, separately by the client B and the server S, half of the possessed keys randomly, exchanging the selected keys with each other, and informing each other of positions of the exchanged keys in all the keys; after completion of symmetric exchange, combining, by the server S, the possessed key $K_{0,keep}^S$ and the key $K_{0,forward}^B$ sent by B into $M_0^S = (K_{0,keep}^S, K_{0,forward}^B)$ used to verify the message bit 0 and $M_1^S = (K_{0,keep}^S, K_{0,forward}^B)$ used to verify the message bit 1; and likewise, performing, by B, the same operations, to obtain $M_0^B$ and $M_1^B$, where a secure classical encryption channel is used during exchange between B and S, so as to prevent the client A from denying signature.

Further, the mail signature phase includes the following specific steps:

step 2-1: after a message to be sent is inputted, converting, by the client A, the message to be sent into a binary code by means of a specific coding scheme or algorithm, where the bit 0 is signed by using $A_0^B$ and $A_0^S$ together, and the bit 1 is signed by using $A_1^B$ and $A_1^S$ together;

step 2-2: according to the requirements in a QDS protocol, using, by the client A, an initial key of L bits in length to sign each bit of message, for example, according to security parameters set by the system, using every 3000 bits of key to sign 1 bit of message, including 1500 bits of key generated by agreement with B and 1500 bits of key generated by agreement with S;

step 2-3: performing the same signature method for each bit of the message, and sending the signed message to the server S, where if the client A sends bit-0 information, a combination of the sent message and the signature is denoted as (0, $A_0^B$, $A_0^S$); and likewise, if bit-1 information is sent, a combination of the sent message and the signature may be denoted as (1, $A_1^B$, $A_1^S$); and step 2-4: because a relatively long key bit string is produced during a single key generation, discarding, by the client A, an unused key bit string after completion of the foregoing signature steps for each bit of possessed keys, such that one-time pad encryption is achieved.

Further, in step 2-2, a longer length L of the initial key means higher security of the signed message, and a specific value of L is selected according to actual requirements.

Further, the signature verification phase includes the following specific steps:

step 3-1: if the message sent by the client A to the server is (0, $A_0^B$, $A_0^S$), comparing, by the server S, the message with $M_0^S = (K_{0,keep}^S, K_{0,forward}^B)$ mentioned in step 1-3 after receiving the message, where an exclusive or operation is performed on corresponding positions of $K_{0,keep}^S$ and $A_0^S$, and on corresponding positions of $K_{0,forward}^B$ and $A_0^B$; marking a position at which an output result is 1 as a bit error; likewise, when the message sent by the client A is (1, $A_1^B$, $A_1^S$), performing the same operations; and obtaining a bit error rate (BER) after completion of comparison between all the bit keys;

step 3-2: if the BER is greater than a BER threshold set by the system, discarding, by the server, the whole message and informing the transmitting end that "the message fails to be sent and needs to be resent"; otherwise, forwarding the received message to the receiving end B, where in this case, the server S not only performs verification with keys, but also takes on message forwarding;

step 3-3: performing, by the client B, the same operations as the server S after receiving the message, namely, comparing, by the client B, the received message (m, $A_m^S$, $A_m^B$) with a key bit string $M_m^B = (K_{m,keep}^B, K_{m,forward}^S)$ possessed by the client B, where an exclusive or operation is performed on corresponding positions of $K_{m,keep}^S$ and $A_m^S$, and on corresponding positions of $K_{m,forward}^B$ and $A_m^B$; marking a position at which an output result is 1 as a bit error; and obtaining a BER after completion of comparison between all the bit keys; and step 3-4: if the BER is greater than a minimum BER threshold set by the system, refusing, by the client B, to receive the message and informing the server of a corresponding result; and after receiving the notification from B, notifying, by the server S, the client A that "the message probably has been tampered with and is required to be resent"; or if the BER is less than the minimum BER threshold set by the system, receiving, by the client B, the message and notifying the server S of a corresponding result; and after receiving the notification from B, notifying, by the server, the client A that "the message has been securely sent to a destination and received".

The present invention achieves the following advantageous effects: The present invention provides a QDS-based mail system and a transceiving method, so that the security of mails encrypted by means of the QDS no longer depends on the algorithm complexity, but is guaranteed based on the fundamental principle of quantum mechanics. Because the QDS is theoretically unbreakable, the use of the QDS to encrypt the mails strongly guarantees the security of the mails as compared with an algorithm-based signature.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The technical solution of the present invention is further described in detail below with reference to the accompanying drawings of the specification.

Figure 1:
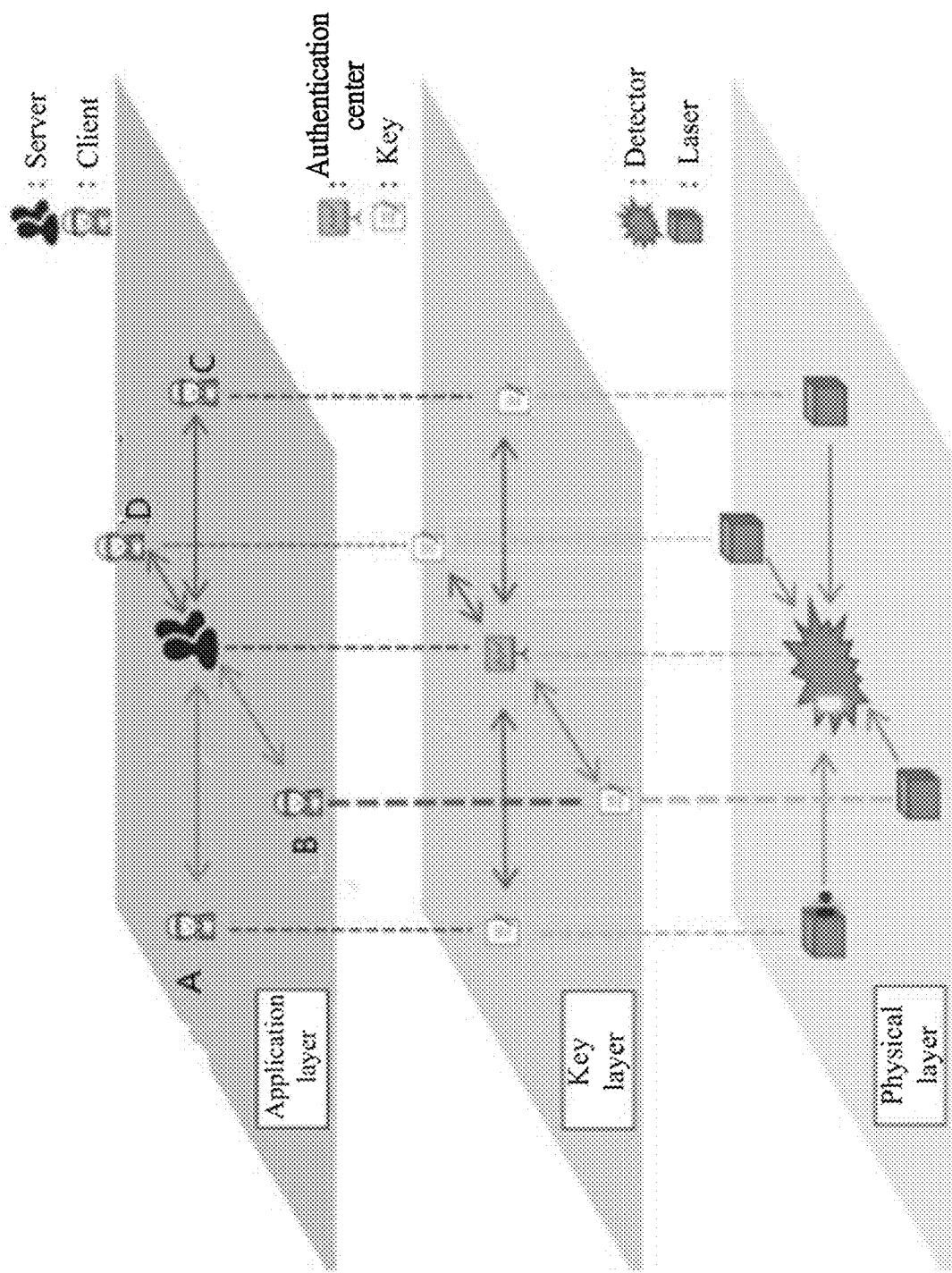
FIG. 1 is a schematic structural diagram of a three-layer mail system of the present invention.
Figure 2:
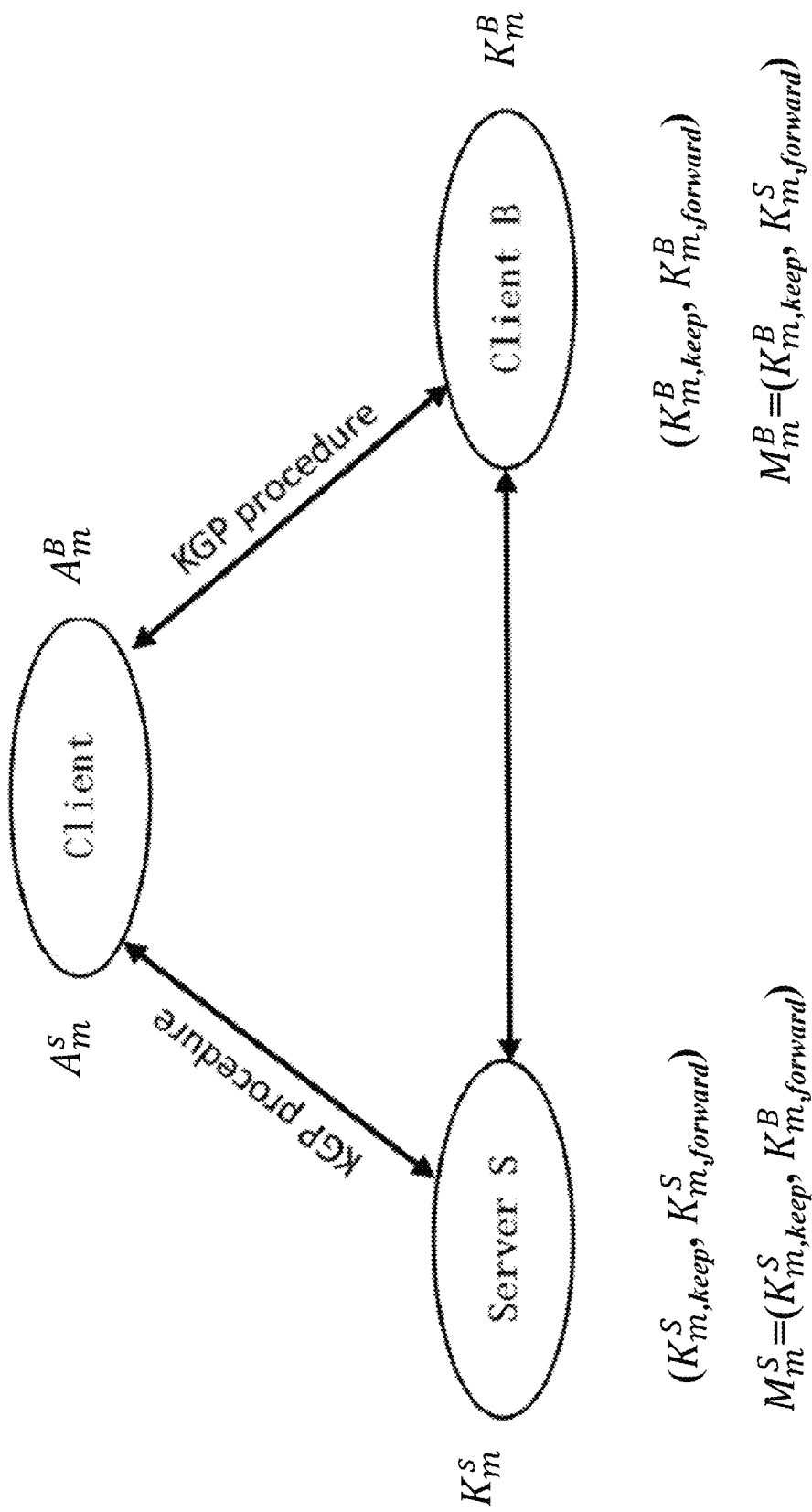
FIG. 2 is a schematic diagram of a QKD phase in a transceiving method of the present invention.
Figure 3:
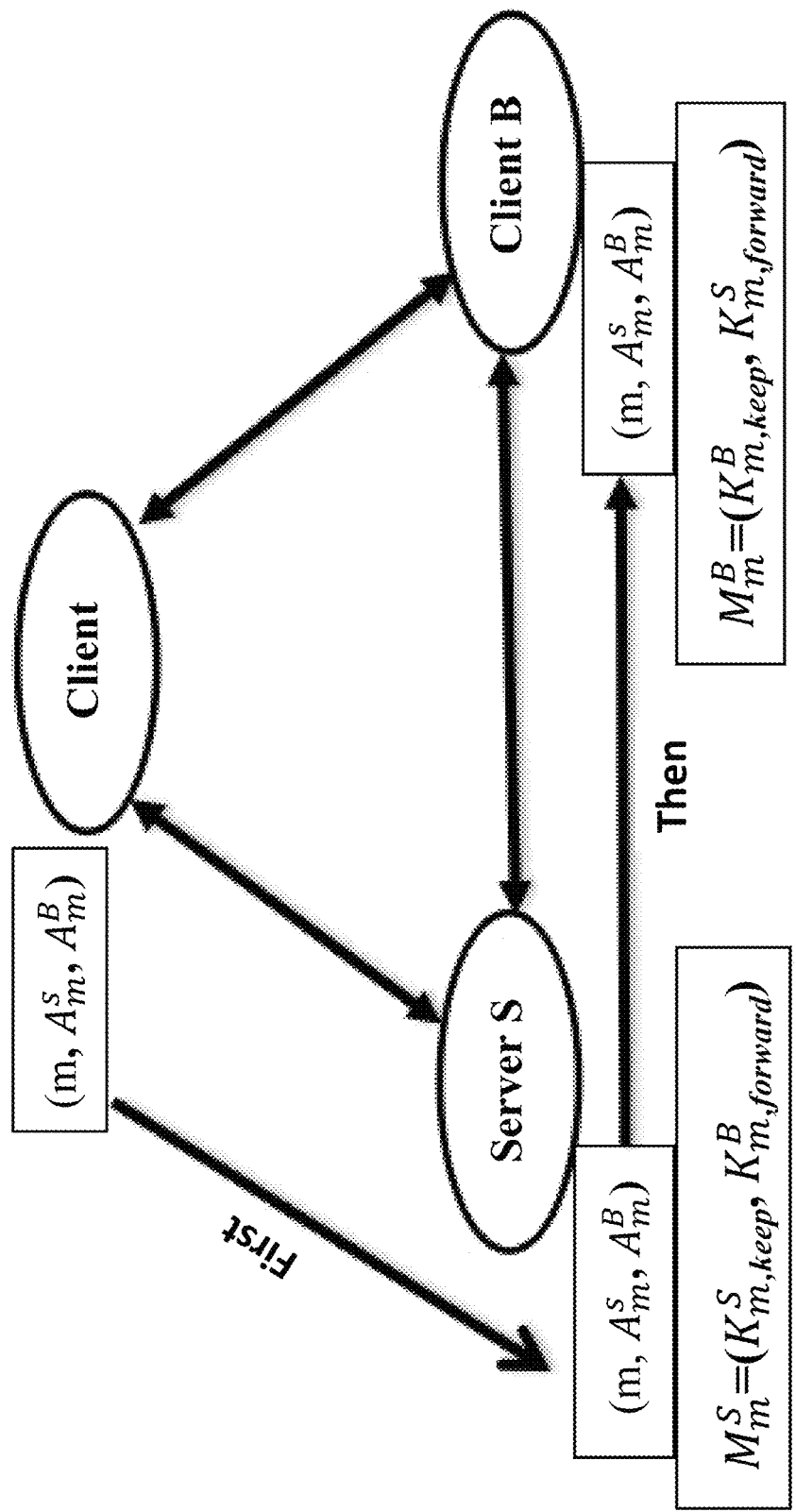
FIG. 3 is a schematic diagram of mail signature and signature verification phases in the transceiving method of the present invention.

A QDS-based mail system and a transceiving method are provided. Referring to FIG. 1, the mail system is a three-layer structure formed by a physical layer, a key layer, and an application layer successively from the bottom up. The physical layer is a key generation terminal and is used to generate a key string for signature in real time. The key layer is used to store the key string generated by the physical layer and provide a required key to the upper layer, namely, the application layer when required. The application layer is a transceiving software part in the mail system, and is used to extract keys generated by the physical layer from the key layer so as to encrypt information to be sent.

A use terminal corresponding to the application layer includes clients A and B and a server S. The client A serves as a transmitting end and the client B servers as a receiving end. A mail transceiving method includes: a QKD phase, a mail signature phase, and a signature verification phase.

In the QKD phase, the transmitting end A needs to acquire two sets of keys respectively for the server S and the receiving end B, which are used to encrypt bits 1 and 0 respectively. The keys are generated by the physical layer, and stored in the key layer. When required, the application layer may take the corresponding keys out of the key layer at any time. The distribution phase includes the following steps:

Step 1-1: Assuming that the client A needs to send a message to the client B, the clients A and B generate corresponding keys $A_1^B$ and $A_0^B$ each having a length of L according to a KGP, where $A_1^B$ is used to sign the bit 1 and $A_0^B$ is used to sign the bit 0. In this case, the client B also possesses two keys $K_0^B$ and $K_1^B$ each having a length of L bits, where the superscripts indicate that the keys are possessed by the client B and the subscripts indicate a specific message to be verified in the future.

Step 1-2: The client A and the server S generate two corresponding keys $A_1^S$ and $A_0^S$ each having a length of L according to the KGP, where $A_1^S$ is used to encrypt the bit 1 and $A_0^S$ is used to encrypt the bit 0. In this case, the server S also possesses two keys $K_0^S$ and $K_1^S$ each having a length of L, where the superscripts indicate that the keys are possessed by the server S and the subscripts indicate a specific message to be verified in the future.

Step 1-3: In the case where the transmitting end A possesses four keys $A_0^B$, $A_1^B$, $A_0^S$, and $A_1^S$ each having a length of L bits after the foregoing procedure, the receiving end B and the server S separately select half of the possessed keys randomly, exchange the selected keys with each other, and inform each other of positions of the exchanged keys in all the keys. After completion of symmetric exchange, the server S combines the possessed key $K_{0,keep}^S$ and the key $K_{0,forward}^B$ sent by B into $M_0^S=((K_{0,keep}^S, K_{0,forward}^B)$ used to verify the message bit 0 and $M_1^S=(K_{0,keep}^S, K_{0,forward}^B)$ used to verify the message bit 1. Likewise, B performs the same operations, to obtain $M_0^B=(K_{0,keep}^B, K_{0,forward}^S)$ and $M_1^B=(K_{0,keep}^B, K_{0,forward}^S)$. A secure classical encryption channel is used during exchange between B and S, so as to prevent the client A from denying signature.

In the mail signature phase, the client is in charge of signing a message with the possessed keys, which includes the following specific steps:

Step 2-1: After a message to be sent is inputted, the client A converts the message to be sent into a binary stream by means of a specific coding scheme or algorithm, where the bit 0 is signed by using $A_0^B$ and $A_0^S$ together, and the bit 1 is signed by using $A_1^B$ and $A_1^S$ together.

Step 2-2: According to the requirements in a QDS protocol, an initial key of L in length needs to be used to sign each bit of message, and a longer L means higher security of the signed message. This embodiment employs a signature manner using 3000 bits of key for each bit of message, where a specific value of L is selected according to actual requirements. For example, according to security parameters set by the system, this embodiment uses every 3000 bits of key to sign 1 bit of message, including 1500 bits of key generated by agreement with B and 1500 bits of key generated by agreement with S.

Step 2-3: Each bit of the message is signed with the same method, and the message is sent to the server after completion of signature. If the sender A sends bit-0 information, a combination of the sent message and the signature may be denoted as $(0, A_0^B, A_0^S)$; and likewise, if bit-1 information is sent, a combination of the sent message and the signature may be denoted as $(1, A_1^B, A_1^S)$.

Step 2-4: Because a relatively long key bit string is produced during a single key generation, the client A discards the remaining key bit string after completion of the foregoing signature steps for each bit of possessed keys, such that one-time pad encryption is achieved.

The signature verification phase includes two verification procedures. In the first procedure, the server verifies a message signature, and in the second procedure, the receiving end B verifies the message signature. Specific steps are as follows:

Step 3-1: If the message sent by the client A to the server is $(0, A_0^B, A_0^S)$, the server S compares the message with $M_0^S=(K_{0,keep}^S, K_{0,forward}^B)$ mentioned in step 1-3 after receiving the message, where an exclusive or operation is performed on corresponding positions of $K_{0,keep}^s$ and $A_0^s$, and on corresponding positions of $K_{0,forward}^B$ and $A_0^B$; and a position at which an output result is 1 is marked as a bit error. Likewise, when the message sent by the client A is $(1, A_1^B, A_1^s)$, the same operations are performed. After completion of comparison between all the bit keys, a bit error rate (BER) is obtained.

Step 3-2: If the BER is greater than a BER threshold set by the server, the server discards the whole message and informs the client that the message fails to be sent and needs to be resent; otherwise, forwards the whole received message to the receiving end B. In this case, the server not only performs verification with the corresponding key, but also takes on message forwarding.

Step 3-3: The client B performs the same operations as the server S after receiving the message. That is, the client B compares the received message $(m, A_m^s, A_m^B)$ (m=0, 1) with a key bit string $M_m^B=(K_{m,keep}^B, K_{m,forward}^S)$ possessed by the client B, where an exclusive or operation is performed on corresponding positions of $K_{m,keep}^s$ and $A_m^s$, and on corresponding positions of $K_{m,forward}^B$ and $A_m^B$; and a position at which an output result is 1 is marked as a bit error. After completion of comparison between all the bit keys, a BER is obtained.

Step 3-4: If the BER is greater than a minimum BER threshold set by the system, the client B refuses to receive the message and feeds back a refusal result to the server. After receiving the notification from B, the server S notifies the client A that "the message probably has been tampered with and is required to be resent". If the BER is less than the minimum BER threshold set by the system, the client B receives the message and notifies the server S of a corresponding result. After receiving the notification from B, the server notifies the client A that "the message has been securely sent to a destination and is received".

A brief analysis and summary of the above procedures are made below:

First, the present invention is based on a common QKD protocol: the BB84 protocol, which guarantees the communication security according to no-cloning of a non-orthogonal single-quantum state. Generally speaking, the most common threat to both communicating parties is intercept by a third party. By taking intercept-resend attack as an example, assuming that A sends quantum states to S, an attacker B randomly selects a set of bases like S to measure the received states and record results, further prepares corresponding quantum states according to the results, and sends the prepared states to S to form a closed-loop attack. Herein, not knowing which polarization state A sends, B has a certain probability of choosing a right base, and prepares a corresponding state and then sends it to S, without arousing any suspicion. If selecting a wrong base, B may prepare a wrong state, arousing suspicion. In fact, the key to ensuring security of the BB84 protocol is that the protocol enables coding and decoding by using two sets of non-orthogonal bases. Thus, according to the quantum no-cloning theorem, it is impossible for B to perfectly clone the two sets of non-orthogonal quantum states without causing any disturbance.

Afterwards, in cooperation with the BB84 protocol, a signature protocol used in the QKD phase is a KGP protocol used to guarantee the communication security. Although the KGP protocol is based on a QKD protocol herein, they cannot be equated in terms of security analysis. The security analysis regarding the KGP does not directly conform to that regarding the QKD protocol. The number not matching that of the keys of the receiver matters to the KGP protocol, while information about the key and held by the attacker matters to the QKD protocol. Herein, the security of the KGP is analyzed by using the minimum entropy of a QKD-based eavesdropper. That is, without considering the probability, $d(A_i^S, K_i^S)$ is made to be less than $d(E_{guess}, K_i^S)$, where $d(.,.)$ denotes the Hamming distance, and $E_{guess}$ denotes a guess of Eve at $K_i^S$ (Eve may be just the client B herein, because the QDS protocol does not make credible assumptions for any participant).

This embodiment takes the communication between A and S as an example, and KGP-based communication between A and B has a similar procedure. An untrustworthy client A cannot send a pair of entangled states to the server S and the client B simultaneously. Therefore, in order to simplify security analysis, it is assumed that S prepares quantum states and sends them to A through a quantum channel, and S has a phase-randomized coherent-state light source. S may select a different intensity of the light source from $u_1$, $u_2$, and $u_3$ according to the probabilities ($P_{u1}$, $P_{u2}$, $P_{u3}$), where $u_1 > u_2 > u_3$. Keys are generated by using all the intensities. Afterwards, S randomly selects a pair of message codes from four quantum states: $|0_Z\rangle|1\rangle$, $|0_X\rangle = 1/(\sqrt{2}(|0_Z\rangle + |1_Z\rangle))$, and $|1_X\rangle = 1/\sqrt{2}(|0_Z\rangle - 1_Z\rangle)$, where $|0_Z\rangle$ and $|1_Z\rangle$ constitute the base X, and $|1_X\rangle$ and $|1_X\rangle$ constitute the base Z. The selection between the base X and the base Z is determined respectively according to the probabilities of $P_X > \frac{1}{2}$ and $P_Z = 1 - P_X \leq \frac{1}{2}$, and the means of selecting mismatched bases aims to improve the protocol efficiency. S independently selects the light intensity and the prepared quantum state, so as to avoid correlation between the intensity and the information codes. A also independently selects the base X or Z according to the probability $P_X$ or $P_Z$ for measurement, to obtain one of the following four measurement results: {0, 1, Ø, d}, where 0 and 1 are bit values, Ø indicates not detected, and d indicates a dual-detector response event. When the result is d, A randomly selects a bit value, and then A and S publish their selections about the base and intensity through a certified classical channel therebetween. If state preparation is inconsistent with the measurement base or the detector of A has no response, A discards initial codes at corresponding positions, and such a procedure is also referred to as screening. This procedure continues until a sufficient number of measurement results are obtained under each selected base and intensity. A sample of L+k in size is randomly selected from the measurement results of the base X, to generate an original key. A bit string generated by S has four parts: ($V_s$, $Z_s$, $X_{s,\,keep}$, $X_{s,\,forward}$), and A also possesses a corresponding key string, only requiring replacing the subscript S with A, where the character string V has a length of k and is generated by measurement with the base X. This character string is used to estimate the correlation between the bit string A and the bit string S that are generated by measurement with the base X, and is then discarded. The character string Z is generated by measurement with the base Z and is used to quantize information obtained after eavesdropping by Eve. Two bit strings $X_{S,\,keep}$ and $X_{S,\,forward}$ of L/2 in length together form a key $K_i^S$ for S, thus realizing the procedure of key exchange with the client B in the foregoing implementation steps. In short, it is by the complementarity between the bases X and Z that the disturbance caused by the eavesdropper may affect the coherence between A and S. Therefore, it is only required to determine the minimum entropy of the character string X of S that the eavesdropper can obtain.

In the case of a finite length, that is, in the case where a finite number of quantum states are sent and measured, Eve is allowed to perform an entanglement operation on any quantum state sent through a quantum channel, and to perform any measurement on a state stored in a quantum memory as an auxiliary system at any time in the future. Even though both A and S could be dishonest in the foregoing procedure, they cannot get any benefit from the KGP. Therefore, it is assumed that KGP-based behavior is credible. In order to obtain the minimum entropy, the smooth minimum entropy of Eve can be calculated in essence based on a degree of correlation between $Z_S$ and $Z_A$ and according to the uncertainty of the entropy. For ease of expression, X is used to indicate $X_{S,\,keep}$ and n is used to indicate its length in the following description. The communication in which Eve acquires information from the classical communication between A and S is public and certified. Classical random variables V, $\Theta^n$, and $X_{S,\,forward}$ are information acquired by Eve from a base selection statement in the parameter estimation and screening step. If Eve is the client B, it indicates forwarding of $X_{S,\,forward}$ by S. All information obtained by Eve is collected to an additional quantum system $H_E$ containing coherent attacks by Eve and to a space containing states of encoded strings V, $\Theta^n$, and $X_{S,\,forward}$ that are assumed to be known to Eve. The smooth minimum entropy is as follows:

$$H_{min}^\epsilon(X|E) \gtrsim s_{X,0}^L + s_{X,1}^L[1 - h(\phi_{X,1}^U)] \quad (1)$$

where the inequality includes a small additive term proportional to $\log_2(1/\epsilon)$. $S_{X,0}^L$ and $S_{X,1}^L$ therein respectively indicate the numbers of photon pulses 0 and 1 that reach A, and constitute all of the character string X; $\emptyset_{X,1}^U$ indicates a phase error rate from a single photon pulse in measurement with the base X; and the superscripts U and L indicate the worst-case scenario estimation.

Afterwards, a method for limiting the number of errors Eve may make in guessing the key of B is sought in the case of the given smooth minimum entropy of Eve. It is assumed that B and Eve share the state $\rho_{XE}$, where X indicates an n-bit character string not forwarded to Eve in the key of B, and E is a relevant quantum system which is possessed by Eve and includes all information acquired from the classical communication. For any eavesdropping policy, in guessing X, an average probability that Eve makes at most r errors may be limited as follows:

$$\langle P_r \rangle \leq \Sigma_{k=0}^r \binom{n}{k} 2^{-H_{min}^\epsilon X|E} \rho_\in \quad (2)$$

One can further use Markov's inequality to say that for any a>0:

Prob(the number of errors made by Eve is less than r):=Pr≤a  (3)

except with probability at most:

$$\epsilon_F := \frac{1}{\alpha}\left(b_n^r 2^{-H_{min}^\epsilon(X|E)\rho} + \epsilon\right), \quad (4)$$

where $$b_n^r := \sum_{k=0}^r \binom{n}{k},$$

and when n is rather large, $b_n^r \approx 2^{nh(r/n)}$. Therefore, a limit on the probability that Eve makes errors of less than r in number is obtained in the case of the smooth minimum entropy. For the minimum entropy, there is an equation as follows:

$$\epsilon_F = \frac{1}{a}\left[2^{-n\{c_{X,0}^L + c_{X,1}^L[1-h(\phi_{X,1}^U)]-h(\frac{r}{n})\}} + \epsilon\right] \quad (5)$$

where $C_{X,i}^L := S_{X,0}^L/n$ contains the lower limit of an X-base pulse count rate regarding a photon i. For simplicity, the foregoing equation is processed to obtain the following condition:

$$c_{X,0}^L + c_{X,1}^L[1-h(\phi_{X,1}^U)] - h\left(\frac{r}{n}\right) > 0 \quad (6)$$

This condition determines whether Eve can make errors of less than r in number at a non-negligible probability. If the condition holds true, the probability that the number of Eve's errors is less than r can be made arbitrarily small by increasing n. The minimum probability $P_E$ that Eve makes errors (excluding the case where the probability is negligible) may be defined by using the following formula:

$$c_{X,0}{}^L + c_{X,1}{}^L[1-h(\phi_{X,1}{}^U)] - h(P_E) = 0. \quad (7)$$

Assuming that the upper limit of the error rate in measurement with the base X between A and S is $e_X{}^U$, parameter selection is required and a large enough signature length exists as long as $P_E > e_X{}^U$. That is to say, as long as the following formula is met, the QDS can be realized:

$$c_{X,0}{}^L + c_{X,1}{}^L[1-h(\phi_{X,1}{}^U)] - h(e_X{}^U) > 0. \quad (8)$$

Supported by the foregoing theory, a QDS-based mail system is realized. The BER threshold of the server mentioned in the implementation steps may be set personally. Specifically, in the case of given security parameters, the BER of the key string generated by a key generation system in the physical layer is already determined within a certain range. In this case, a lower BER threshold means more stringent requirements on a single key generation and better guarantees the reliability of the message. Therefore, when a BER of a key bit string generated at a time is greater than the set threshold, the server S refuses to forward the message to the client B and feeds back a result to the client A, while the client B refuses to receive the message and feeds back a result to the server S. In this case, a key generation terminal is required to re-generate the key. The same communication procedure is repeated until the BER of the generated key is less than the set threshold.

The above merely describes preferred embodiments of the present invention, but the scope of protection of the present invention is not limited thereto. Any equivalent modifications and changes made according to the disclosed content of the present invention by those of ordinary skill in the art all fall within the scope of protection recorded in the claims.

What is claimed is:

1. A transceiving method, applicable for a Quantum Digital Signature (QDS)-based mail system,
    wherein the mail system is a three-layer structure foamed by a physical layer, a key layer, and an application layer; the physical layer is a key generation terminal and is used to generate a key string for signature in real time; the key layer is used to store the key string generated by the physical layer and provide a required key to the upper layer, namely, the application layer when required; and the application layer is a transceiving software part in the mail system, and is used to extract keys generated by the physical layer from the key layer so as to encrypt information to be sent;
    wherein a user terminal corresponding to the application layer comprises clients A and B and a server S; the client A serves as a transmitting end and the client B servers as a receiving end;
    wherein the transceiving method comprises: a quantum key distribution (QKD) phase, a mail signature phase, and a signature verification phase;
    wherein in the QKD phase, the transmitting end A needs to acquire two sets of keys respectively for the server S and the receiving end B, which are used to encrypt bits 1 and 0 respectively, wherein the keys are generated by the physical layer and stored in the key layer; and when required, the application layer takes the corresponding keys out of the key layer at any time;
    wherein in the mail signature phase, the client is in charge of signing a message with the possessed keys; and
    wherein the signature verification phase comprises two verification procedures: in a first procedure, the server verifies a message signature, and in a second procedure, the receiving end B verifies the message signature
    wherein the distribution phase comprises the following steps:
    step 1-1: when that the client A needs to send a message to the client B, generating, by the clients A and B, corresponding keys $A^B{}_1$, and $A^B{}_0$ each having a length of L according to a key generation protocol (KGP), wherein $A^B{}_1$ is used to sign the bit 1 and $A^B{}_0$ is used to sign the bit 0; and in this case, the client B also possesses two keys $K^B{}_0$ and $K^B{}_1$ each having a length of L bits, the superscripts indicating that the keys are possessed by the client B and the subscripts indicating a specific message to be verified in the future;
    step 1-2: generating, by the client A and the server S, two corresponding keys $A^S{}_1$ and $A^S{}_0$ each having a length of L according to the KGP, wherein $A^S{}_1$ is used to encrypt the bit 1 and $A_1{}^S$ is used to encrypt the bit 0; and in this case, the server S also possesses two keys $K^S{}_0$ and $K^S{}_1$ each having a length of L, the superscripts indicating that the keys are possessed by the server S and the subscripts indicating a specific message to be verified in the future; and
    step 1-3: in the case where the client A possesses four keys $A^B{}_0$, $A^B{}_1$, $A^S{}_0$, and $A^S{}_1$ each having a length of L bits after the foregoing procedure, selecting, separately by the client B and the server S, half of the possessed keys randomly, exchanging the selected keys with each other, and informing each other of positions of the exchanged keys in all the keys; after completion of symmetric exchange, combining, by the server S, the possessed key $K^S{}_{0,keep}$ and the key $K^B{}_{0,forward}$ sent by B into $M_0{}^S=(K^S{}_{0,keep}, K^B{}_{0,forward})$ used to verify the message bit 0 and $M_1{}^S=(K^S{}_{0,keep}, K^B{}_{0,forward})$ used to verify the message bit 1; and likewise, performing, by B, the same operations, to obtain $M_0{}^B=(K^B{}_{0,keep}, K^S{}_{0,forward})$ and $M_1{}^B=(K^B{}_{0,keep}, K^S{}_{0,forward})$, wherein a secure classical encryption channel is used during exchange between B and S, so as to prevent the client A from denying signature.

2. The transceiving method according to claim 1, wherein the mail signature phase comprises the following specific steps:
    step 2-1: after a message to be sent is inputted, converting, by the client A, the message to be sent into a binary code by means of a specific coding scheme or algorithm, wherein the bit 0 is signed by using $A^B{}_0$ and $A^S{}_0$ together, and the bit 1 is signed by using $A^B{}_1$ and $A^S{}_1$ together;
    step 2-2: according to requirements in a QDS protocol, using, by the client A, an initial key of L bits in length to sign each bit of message, for example, with given security parameters, using a key of 3000 bits in length to sign a 1-bit message, including 1500 bits of key generated by agreement with B and 1500 bits of key generated by agreement with S;

step 2-3: performing, by the client A, the same signature method for each bit of the message, and sending the signed message to the server S, wherein when the transmitting end sends bit-0 information, a combination of the sent message and the signature is denoted as $(0, A^B_0, A^S_0)$; and likewise, when bit-1 information is sent, a combination of the sent message and the signature may be denoted as $(1, A^B_1, A^S_1)$; and step 2-4: because a relatively long key bit string is produced during a single key generation, discarding, by the client A, an unused key bit string after completion of the foregoing signature steps for each bit of possessed keys, such that one-time pad encryption is achieved.

3. The transceiving method according to claim 2, wherein in step 2-2, a longer length L of the initial key means higher security of the signed message, and a specific value of L is selected according to actual requirements.

4. The transceiving method according to claim 1, wherein the signature verification phase comprises the following specific steps:

step 3-1: when the message sent by the client A to the server is $(0, A^B_0, A^S_0)$, comparing, by the server S, the message with $M^S_0 = (K^S_{0,keep}, K^B_{0,forward})$ mentioned in step 1-3 after receiving the message, wherein an exclusive or operation is performed on corresponding positions of $K^S_{0,keep}$ and $A^S_0$, and on corresponding positions of $K^B_{0,forward}$ and $A^B_0$; marking a position at which an output result is 1 as a bit error; likewise, when the message sent by the client A is $(1, A^B_1, A^S_1)$, performing the same operations; and obtaining a bit error rate (BER) after completion of comparison between all the bit keys;

step 3-2: when the BER is greater than a BER threshold set by the server, discarding, by the server, a whole message and informing the client A that the message fails to be sent and needs to be resent; otherwise, forwarding the whole message received to the receiving end B, wherein in this case, the server not only performs verification with the corresponding key, but also takes on message forwarding;

step 3-3: performing, by the client B, the same operations as the server S after receiving the message, namely, comparing, by the client B, the received message $(m, A^S_m, A^B_m)$ with a key bit string $M^B_m = (K^B_{m,keep}, K^S_{m,forward})$ possessed by the client B, wherein an exclusive or operation is performed on corresponding positions of $K^S_{m,keep}$ and $A^S_m$, and on corresponding positions of $K^B_{m,forward}$ and $A^B_m$; marking a position at which an output result is 1 as a bit error; and obtaining a BER after completion of comparison between all the bit keys; and step 3-4: when the BER is greater than a minimum BER threshold set by the system, refusing, by the client B, to receive the message and informing the server of a corresponding result; and after receiving the notification from B, notifying, by the server S, the client A that "the message probably has been tampered with and is required to be resent"; or when the BER is less than the minimum BER threshold set by the system, receiving, by the client B, the message and notifying the server S of a corresponding result; and after receiving the notification from B, notifying, by the server, the client A that "the message has been securely sent to a destination and is received".

* * * * *